US006768104B1

(12) United States Patent

Sauer et al.

(10) Patent No.: US 6,768,104 B1

(45) Date of Patent: Jul. 27, 2004

(54) METHOD AND DEVICE FOR PROCESSING SHEETS

(75) Inventors: Hartmut Karl Sauer, Himmelstadt (DE); Johannes Georg Schaede, Würzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 220 days.

(21) Appl. No.: 10/048,995

(22) PCT Filed: Aug. 11, 2000

(86) PCT No.: PCT/DE00/02694

§ 371 (c)(1), (2), (4) Date: Feb. 20, 2002

(87) PCT Pub. No.: WO01/14111

PCT Pub. Date: Mar. 1, 2001

(30) Foreign Application Priority Data

Aug. 20, 1999 (DE) ........................................ 199 39 165

(51) Int. Cl.[7] ................................................. G06K 9/00

(52) U.S. Cl. .................................. 250/256; 250/559.05

(58) Field of Search ........................... 250/256, 559.05, 250/559.07, 559.39, 559.4, 559.42, 559.44, 556; 382/135, 282; 209/534; 902/6, 7; 235/379; 194/206, 207; 340/5.86; 356/71

(56) References Cited

U.S. PATENT DOCUMENTS

| | | | | |
|---|---|---|---|---|
| 3,939,621 A | | 2/1976 | Giori | |
| 4,397,709 A | * | 8/1983 | Schwenzer | 156/351 |
| 4,677,682 A | | 6/1987 | Miyagawa et al. | |
| 4,939,350 A | | 7/1990 | Sauer | |
| 5,241,483 A | | 8/1993 | Porret et al. | |
| 5,535,871 A | * | 7/1996 | Harbaugh | 194/206 |
| 5,960,103 A | * | 9/1999 | Graves et al. | 382/135 |
| 6,234,294 B1 | * | 5/2001 | Defeo et al. | 194/207 |
| 6,459,806 B1 | * | 10/2002 | Raterman et al. | 382/135 |
| 6,603,872 B2 | * | 8/2003 | Jones et al. | 382/135 |

FOREIGN PATENT DOCUMENTS

| | | |
|---|---|---|
| DE | 40 26 250 C2 | 12/1992 |
| DE | 195 02 784 A1 | 8/1996 |
| EP | 0 737 936 A1 | 10/1996 |
| EP | 0 816 554 A1 | 1/1998 |
| WO | WO 93/13258 | 7/1993 |

* cited by examiner

*Primary Examiner*—Constantine Hannaher
*Assistant Examiner*—Otilia Gabor
(74) *Attorney, Agent, or Firm*—Jones, Tullar & Cooper, PC

(57) ABSTRACT

Sheets carrying imprinted materials are counted using a rotating counting disk that carries at least a receiver connected to a sensor. During counting of the sheets, a location of the imprinted materials on the sheets can also be determined.

11 Claims, 4 Drawing Sheets

METHOD AND DEVICE FOR PROCESSING SHEETS

Figure 1:
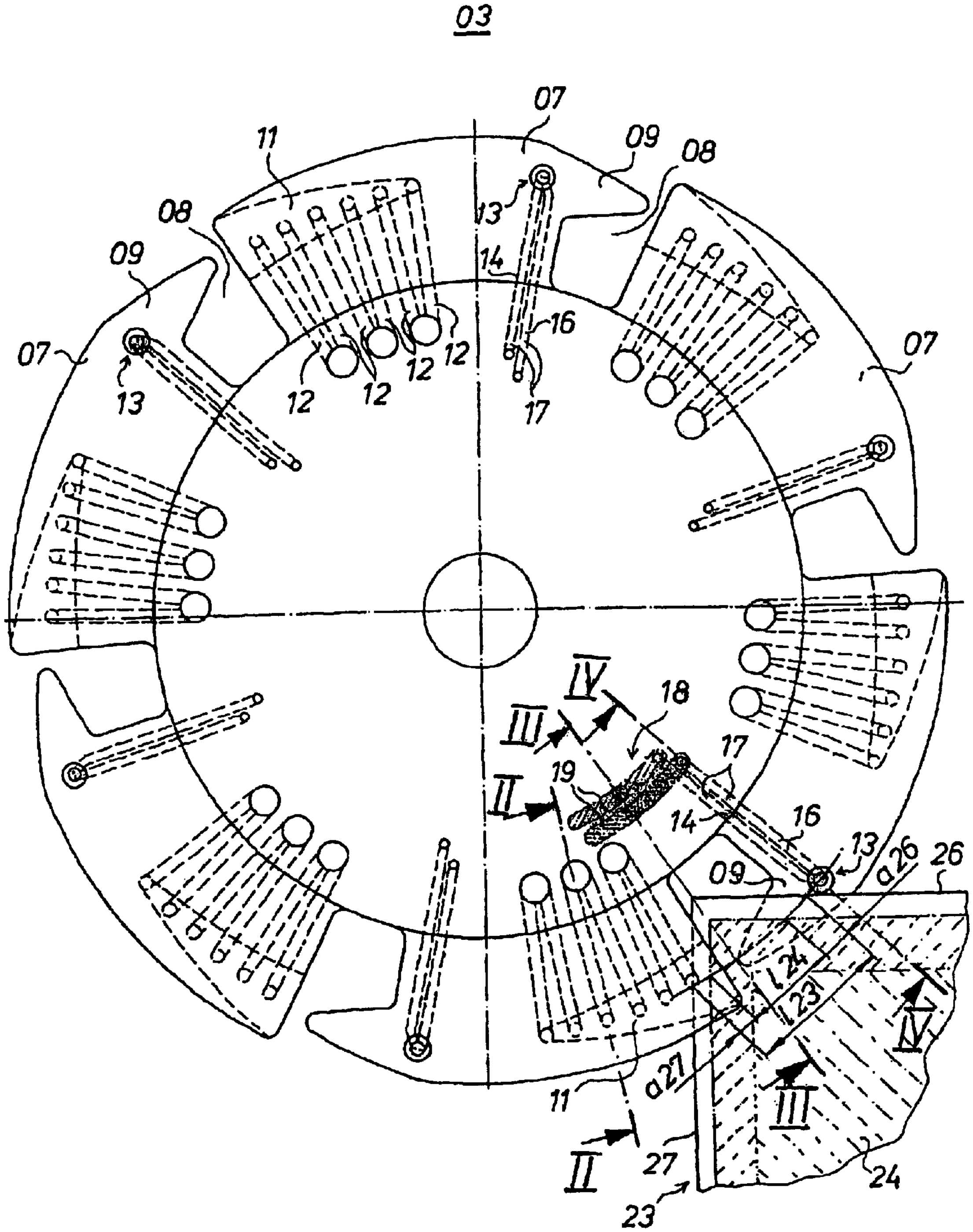

The invention relates to methods and a device for processing sheets in accordance with the characteristics of claims 1, 2 and 3.

DE 40 26 250 C2 describes a device for cutting a web into individual patterns.

EP 0 737 936 A1 describes a rotating counting disk of a sheet counting device.

The invention is based on the object of providing methods and a device for the processing of sheets.

In accordance with the invention, the object is attained by the characteristics of claims 1, 2 and 3.

The advantages which can be obtained by means of the invention consist in particular in that it will be possible to perform a cutting control or to trigger a counting pulse in a simple manner. It is also possible to perform a cutting control with a single device in addition to the counting process.

Figure 2:
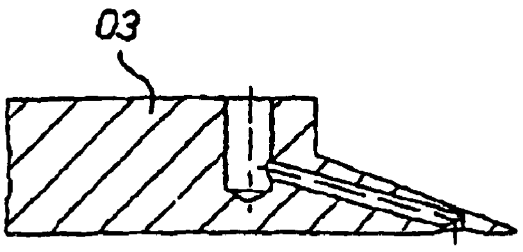
Figure 4:
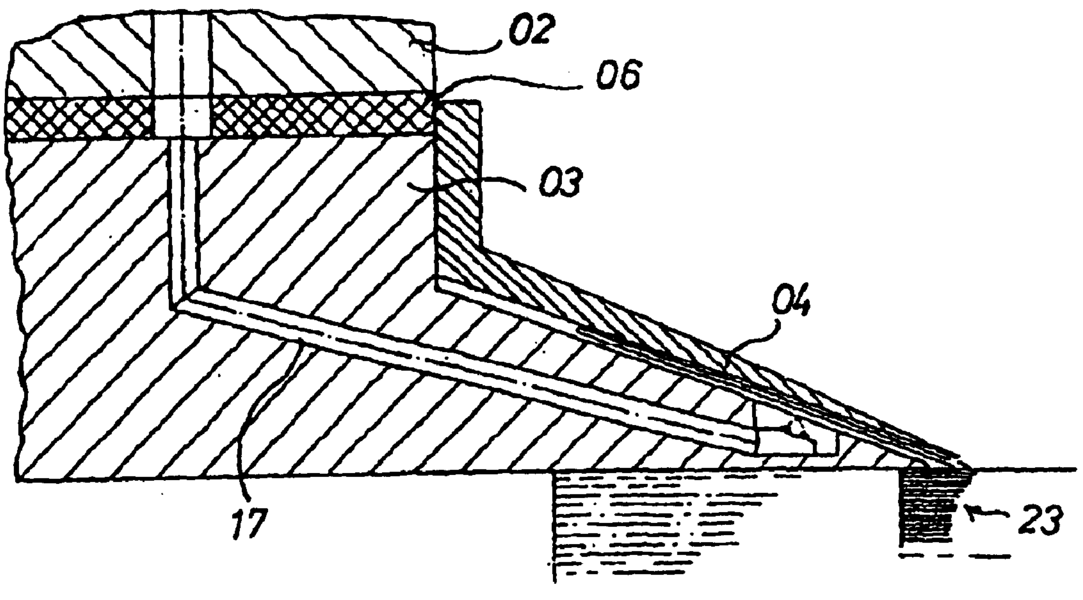
Figure 3:
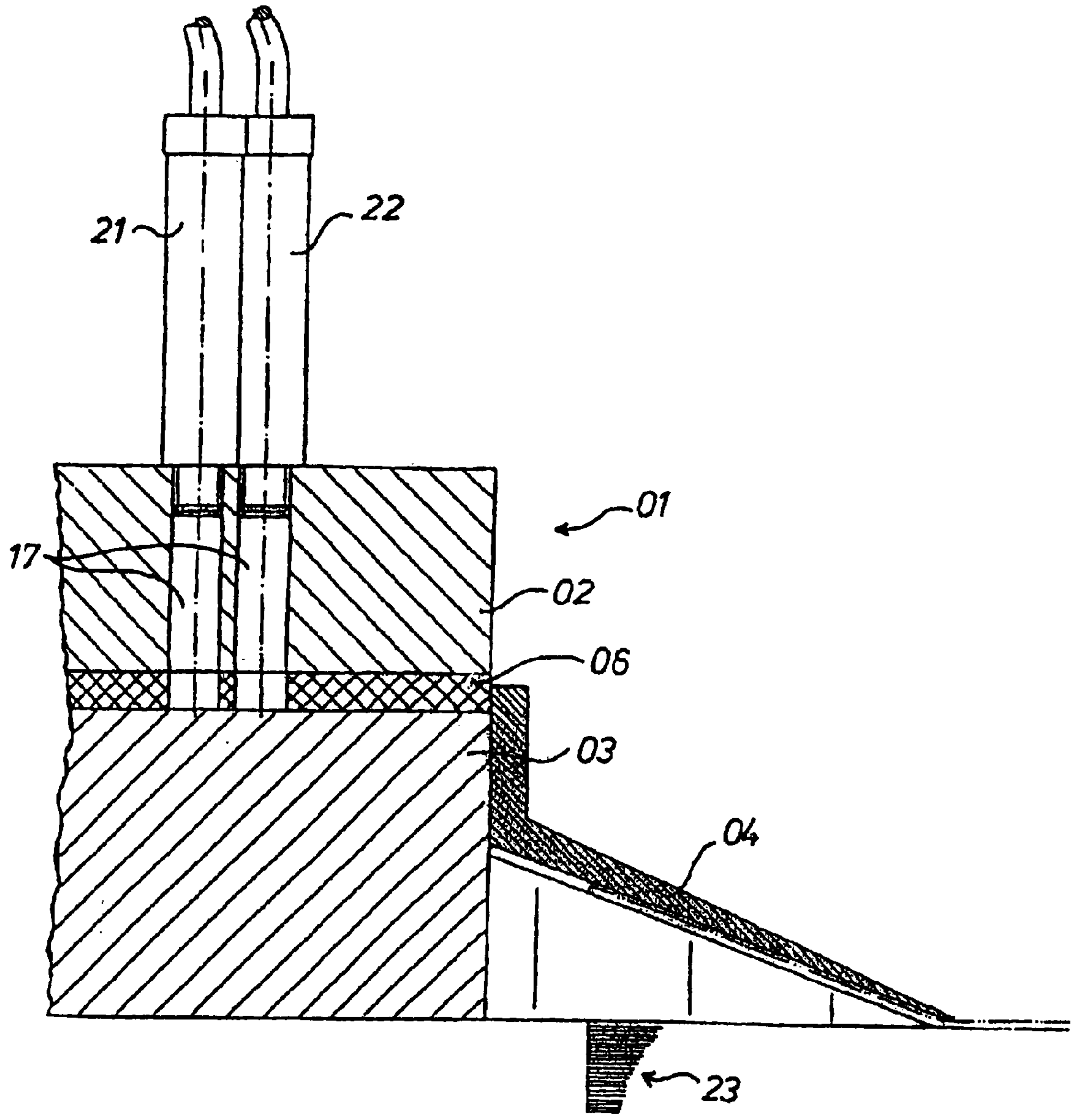
Figure 5:
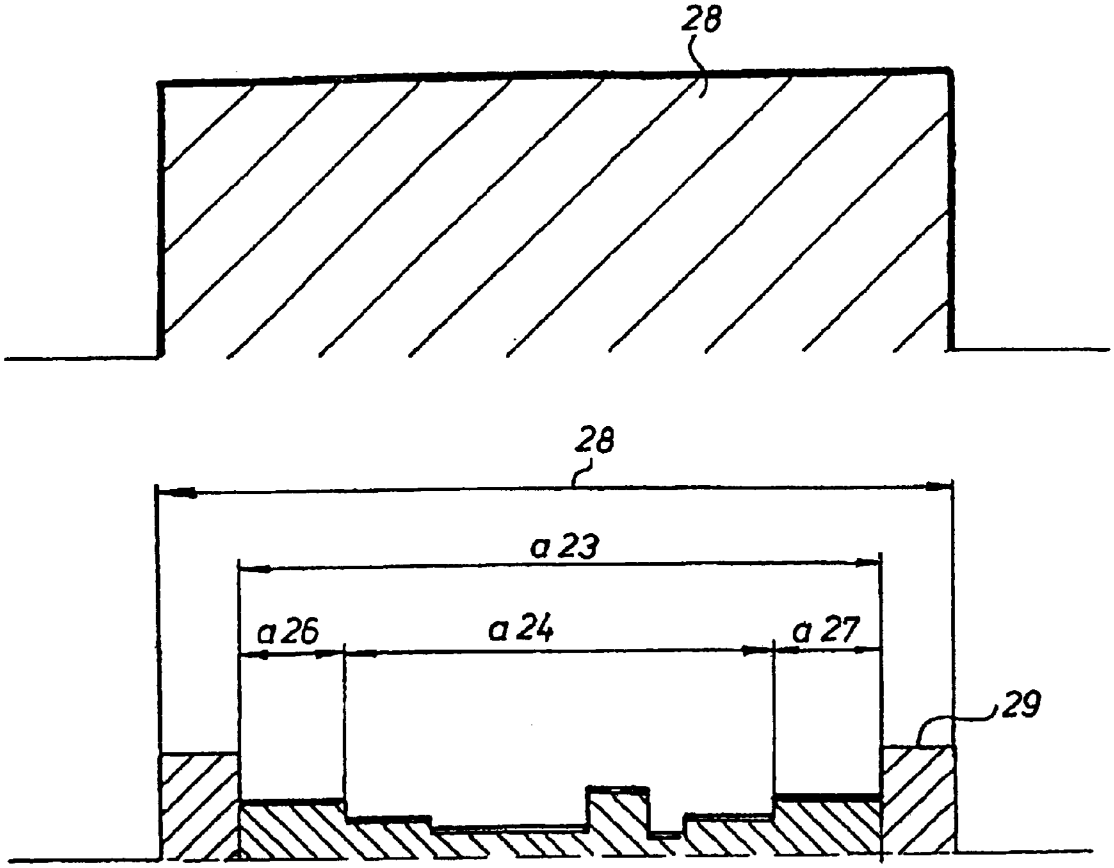

Exemplary embodiments of the invention are represented in the drawings and will be described in greater detail in what follows. Shown are in:

FIG. 1, a schematic representation of a counting disk;

FIG. 2, a first section through the counting disk;

FIG. 3, a second section through the counting disk;

FIG. 4, a third section through the counting disk;

FIG. 5, a schematic course of a signal from a sensor.

A counting device 01 has a fixed disk 02 and a rotating counting disk 03, as well as a cover ring 04 rotating along with the counting disk 03. A friction bearing 06 is arranged between the fixed disk 02 and the rotating counting disk 03.

In the present exemplary embodiment, this counting disk 03 is divided into six equal circumferential sections. On its radial end, each circumferential section has a segment 07, wherein the segments 07 are separated in the circumferential direction by an opening 08 extending in the radial direction. On its leading edge, this segment 07 is provided with a protrusion 09, and on its trailing end with a wedge-shaped depression 11. The depression 11 is arranged on an underside of the segment 07, extends in the circumferential direction and widens in the direction toward the protrusion of a trailing segment 07.

A plurality of conduits 12 for the supply of suction air terminate in this depression 11.

A device 13 for measuring reflections is arranged on each segment 07 in the area of the trailing end of the protrusion 09. For example, this device has a transmitter 14 and a receiver 16, as well as an evaluating device connected with the receiver 16. In the present exemplary embodiment the transmitter 14 and the receiver 16 are embodied as optical waveguides 17 consisting, for example, of glass fibers. These optical waveguides are connected with a rotary transformer 18. This rotary transformer 18 has for example two kidney-shaped optical devices 19 arranged in the fixed disk and extending in the circumferential direction. Each one of these optical devices 19 bundles the light arriving along the optical device 19 in a small area. One end of an optical waveguide 17 is arranged in this area. A second end of this optical waveguide 17 is connected with an illuminating arrangement 21, or a sensor 22.

Thus, an illuminating arrangement 21 and a sensor 22 are respectively assigned to each of the, for example six, segments 07, from which light and reflected rays are conducted by means of optical waveguides 17 from or to the rotating measuring location of the segment 07 of the counting disk 03.

It is also possible to provide a common illuminating arrangement 21 for all measuring locations and its own sensor 22 to each measuring location.

Alternatively the optical waveguides 17 of all measuring locations or groups of measuring locations can be combined and conducted to one sensor 22.

It is also possible to arrange the sensor 22 and the illuminating arrangement 21 directly without optical waveguides at the measuring location. It is then possible to transmit required energy and data by means of inductively operating rotary transformers, for example.

The sensor 22 and the illuminating arrangement 21 can be combined in one structural element.

In place of a counting disk 03 having several segments 07, only one segment 07 is possible.

The mode of functioning of the described device is as follows:

A material to be printed has been imprinted with a plurality of copies 23 and is separated into individual copies 23 after printing. Each one of these copies 23 has a printed image 24. This printed image 24 has a distance a26, a27 from a lateral edge 26, 27 of the copy 23. The lateral edge 26, 27 of the copy 04 corresponds to a cutting edge of the copy 23.

These copies 23 are preferably securities, in particular bills.

A stack of copies 23 arranged on top of each other, i.e. single sheets 23, is placed against the counting device 01, so that a plane defined by the counting disk 03 lies approximately parallel in relation to a plane defined by the copies 23. In this case one corner of the stack is located in such a way that the protrusion 09, as well as the depression 11, of the rotating counting disk 03 pass over the corner of the stack of sheets.

As soon as a depression 11 charged with a vacuum of a segment 07 passes over the corner of a copy 23, this corner is pulled into the depression 11 while forming an arch.

The depression 11 slides over the arch because of the rotation of the counting disk 03, and thereafter the protrusion 09 of the counting disk 03 enters into the space formed by the arch between the aspirated copy 23 and the copy 23 lying under it. The protrusion 09 thus slides underneath the lifted copy 23 along its underside. In the same way the area in which the transmitter 14 and the receiver 16 are arranged slides along the underside of the corner of the copy 23. In the process the two edge areas meeting in the corner between the lateral edge 26, 27 of the copy 23 and the printed image 24 of the copy 23, as well as the printed image 24 located between them, are detected as reflections by the receiver 16.

A window 28 can be fixed over a defined angular area, in which the evaluation of the signals 29 or the illuminating arrangement 21 is activated.

The signals 29 from the receiver 16 are supplied to the evaluating device. Based on the size of the signal 29 as a function of the time and circumferential speed of the counting disk 03, or the angular position of the counting disk, the distance a26, a27 of at least one lateral edge 26, 27 of the copy 23 from the printed image 24 is calculated.

Moreover, the signal 29 provides a measurement of the area detected by the receiver 16 over the copy 23, i.e. a length l23 of the copy 03 and a length l24 of the printed image 24. Thus the exactness of the cut is checked.

In the present example the signal 29 is also used for triggering a counting pulse in addition to the accuracy of the cut.

It is also possible not to perform a cut control and to use the signal 29 only for triggering the counting pulse.

This signal 29, or values determined from it, are compared with preset signals/values, and in case of deviations from these values, which are provided with tolerances, a further signal for alerting or controlling further operations is issued.

List of Reference Numerals

01 Counting device
02 Disk
03 Counting disk
04 Cover ring
05 —
06 Friction bearing
07 Segment
08 Opening
09 Protrusion
10 —
11 Depression
12 Conduit
13 Device for measuring reflections
14 Transmitter
15 —
16 Receiver
17 Optical waveguide
18 Rotary transformer
19 Optical device
20 —
21 Illuminating arrangement
22 Sensor
23 Copy, sheet
24 Printed image
25 —
26 Lateral edge
27 lateral edge
28 window
29 signal
a26 distance
a27 distance
l23 length
l24 length

What is claimed is:

1. A method for processing imprinted material including:

providing imprinted materials each having a plurality of copies;

providing a receiver connected to a sensor which detects reflections;

moving a partial area of one of said plurality of copies and said sensor with respect to each other;

using said sensor for detecting reflections from a scanned area of said one of said plurality of copies;

generating a signal as a function of said reflections from said scanned area of said ones of said plurality of copies;

evaluating said signal as a function of said scanned area; and measuring a distance between a lateral edge of said one of said plurality of copies and a printed image on said one of said copies using said signal.

2. A device for processing sheets comprising:

a counting device, at least a portion of said counting device being movable relative to a sheet to be processed; and a receiver adapted to detect a reflection of at least a partial area of a sheet to be processed, said receiver being arranged on said movable portion of said counting device.

3. The device of claim 2 wherein said receiver is an optical waveguide and further including a sensor, said receiver being connected to said sensor by said optical waveguide.

4. The device of claim 2 further including a plurality of said receivers and at least one sensor, said receivers being connected to said sensor by optical waveguides.

5. The device of claim 2 wherein said receiver is a sensor.

6. The device of claim 2 further including an illuminating arrangement assigned to said receiver.

7. The device of claim 2 further including several of said receivers arranged on said movable portion of said counting device.

8. The device of claim 2 further including a sensor and wherein a signal from said sensor is a measurement of the reflection along the partial area of a sheet.

9. The device of claim 2 wherein a signal from said receiver is a measurement of a distance between a lateral edge of a sheet and a printed image on the street.

10. The device of claim 2 wherein said movable portion of said counting device is a rotating counting disk.

11. The device of claim 10 wherein said rotating counting disk has several segments.

* * * * *